United States Patent [19]

Sugitani et al.

[11] Patent Number: 5,467,241
[45] Date of Patent: Nov. 14, 1995

[54] POWER RECEIVING SYSTEM

[75] Inventors: Sinzi Sugitani; Toru Tanimizu; Koutarou Takematsu, all of Hitachi; Fumio Wakasa, Kitaibaraki; Toshiaki Izumi, Hitachi, all of Japan

[73] Assignee: Hitachi, Ltd., Tokyo, Japan

[21] Appl. No.: 340,480

[22] Filed: Nov. 14, 1994

Related U.S. Application Data

[63] Continuation of Ser. No. 826,604, Jan. 28, 1992, abandoned.

[30] Foreign Application Priority Data

Jan. 28, 1991 [JP] Japan ................................. 3-008287
Mar. 20, 1991 [JP] Japan ................................. 3-056356

[51] Int. Cl.⁶ ..................................................... H02H 7/26
[52] U.S. Cl. .............................. 361/63; 361/62; 361/64; 361/67
[58] Field of Search ................................. 361/64, 62, 63, 361/65–68, 81; 363/56; 307/11, 13, 31, 39, 43, 86

[56] References Cited

U.S. PATENT DOCUMENTS

| 3,921,059 | 11/1975 | Birman et al. | 323/21 |
| 4,354,215 | 10/1982 | van der Scheer | 361/63 |
| 4,639,817 | 1/1989 | Cooper et al. | 361/62 |
| 4,873,601 | 10/1989 | Wakasa | 361/64 |
| 4,903,160 | 2/1990 | Elmore et al. | 361/87 |

FOREIGN PATENT DOCUMENTS 0252122  10/1989  Japan ........................ 361/63

Primary Examiner—A. D. Pellinen
Assistant Examiner—Sally C. Medley
Attorney, Agent, or Firm—Antonelli, Terry, Stout & Kraus

[57] ABSTRACT

In a power receiving system, a network transformer, a protector breaker and a current detector are connected between the load side of each of a plurality of network lines and a network bus, a breaker is connected to the primary side of the network transformer, the current detector being operative to detect an accident current on the secondary side of the network transformer, and relays or an operation controller is provided which is responsive to the detection signal to open the breaker and protector breaker to switch off accident currents on the primary and secondary sides of the network transformer, whereby the protective range is so expanded as to cover a line section between the network transformer and the protector breaker and the scale of the overall power receiving system is reduced.

7 Claims, 2 Drawing Sheets

POWER RECEIVING SYSTEM

This application is a continuation of Ser. No. 07/826,604, filed Jan. 28, 1992, now abandoned.

BACKGROUND OF THE INVENTION

1. Field of the Invention

The present invention relates to a power receiving system which makes improvements especially on a line section between a network transformer and a protector breaker.

2. Description of the Prior Art

In cities, three-dimensional utilization of lands has become active and high-rise buildings have been built actively. In high-rise buildings, the load distribution of power increases in the vertical direction and the load capacity is very large. Because publicly important facilities are accommodated in these buildings, reliability and safety of power service are strongly asked for. The high-rise building is built in a crowded area in cities and therefore the installation area is desired to be as small as possible. For the high-rise building or a plant and equipment in which a large load is concentrated to one location, a network power receiving system having high reliability of power service is considered to be the most suited.

In the network power receiving system in which power from a power source substation is received through a 22 KV or 33 KV distribution line of two to four lines, there are provided on the primary sides of network transformers power receiving breakers alone and on the secondary side a fuse and a protector breaker in association with each network transformer. Protector breakers have their load sides connected in parallel to a network bus, and power is fed to various loads through several trunk lines.

With the above network power receiving system, in the event that a short-circuiting accident occurs on, for example, the primary side or secondary side of the network transformer, an accident circuit is disconnected and power is fed through a sound line to prevent the load from suffering power failure. Therefore this type of system ensures the high reliability of power service which meets customers' needs and recently, has been in high demand.

In the network power receiving system as exemplified in FIG. 2 of U.S. Pat. No. 4,873,601 (teachings of which are incorporated herein by reference), however, in the event that an accident takes place on the secondary side of the network transformer, the network fuse is fused to protect only a network line section between the network fuse and the protector breaker, giving rise to disadvantages that the protective range is narrow, a network fuse dedicated to high voltage must be prepared and the scale of the network power receiving equipment is increased.

SUMMARY OF THE INVENTION

An object of the invention is to provide a power receiving system in which the protective range is so expanded as to cover a line section between the network transformer and the protector breaker.

Another object of the invention is to provide a power receiving system in which the scale of the network power receiving equipment is reduced.

To accomplish the above objects, in a power receiving system according to the invention, a network transformer, a protector breaker and a current transformer are connected between each of a plurality of network lines and a network bus, a breaker is connected to the primary side of the network transformer, and an accident current on the secondary side of the network transformer is detected by the current transformer to provide a detection current which energizes a relay to cause it to open the breaker and protector breaker so as to switch off current on the primary side of the network transformer, whereby the breaker used can be of low interruption capacity to reduce the scale of the network power receiving equipment and the protective range can be expanded to cover a line section between the network transformer and protector breaker.

DESCRIPTION OF THE PREFERRED EMBODIMENTS

Figure 1:
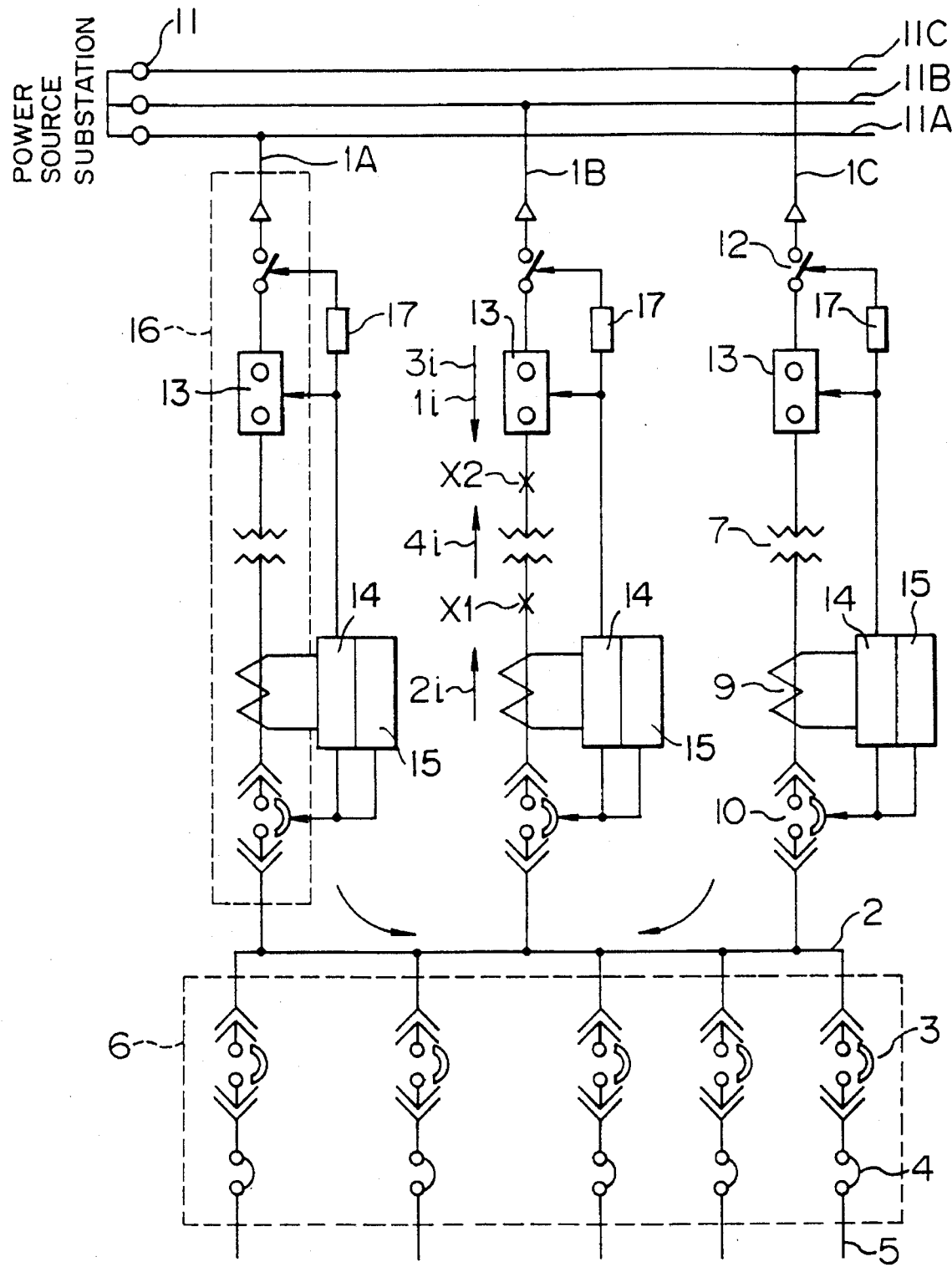
FIG. 1 is a skeleton connection diagram of a network power receiving system for high voltage according to an embodiment of the invention.

An embodiment of the invention will now be described by referring to a network power receiving system for high voltage as shown in FIG. 1.

Referring to FIG. 1, three lines of network lines 1A, 1B and 1C are connected to a network bus 2. Connected to the network bus 2 are load cables 5 each connected with a take-off breaker 3 and a circuit breaker 4. The take-off breakers 3, circuit breakers 4 and load cables 5 are housed in a take-off switch gear (for example, a power-board) 6. Each of the network lines 1A, 1B and 1C is connected with a network transformer 7.

Capacity and % impedance of the network transformer 7 are 2000 KVA and 7.5%. In the network transformer 7, a primary voltage of about 22000 V and a primary current of about 52 A are transformed into a secondary voltage of about 415 V and a secondary current of about 2800 A. In each of the network lines 1A, 1B and 1C, a current transformer 9 and a protector breaker 10 are connected between the secondary side of network transformer 7 and the network bus 2.

Connected between the primary side of the network transformer 7 in each of the network lines 1A, 1B and 1C and respective power source buses 11A, 11B and 11C are a load switch 12 and a vacuum breaker 13. Each of the power source buses 11A, 11B and 11C is connected with a power source side breaker 11. The load switch 12 operatively switches off voltage (about 22000 V) and small current (52 A) on the primary side in each network line 1A, 1B or 1C. The vacuum breaker 13 is operatively opened by an accident current flowing in each network line 1A, 1B or 1C between the secondary side of network transformer 7 and the protector breaker 10 close to the network bus 2. Connected to the secondary side of the current transformer 9 are first and second relays 14 and 15.

Figure 2:
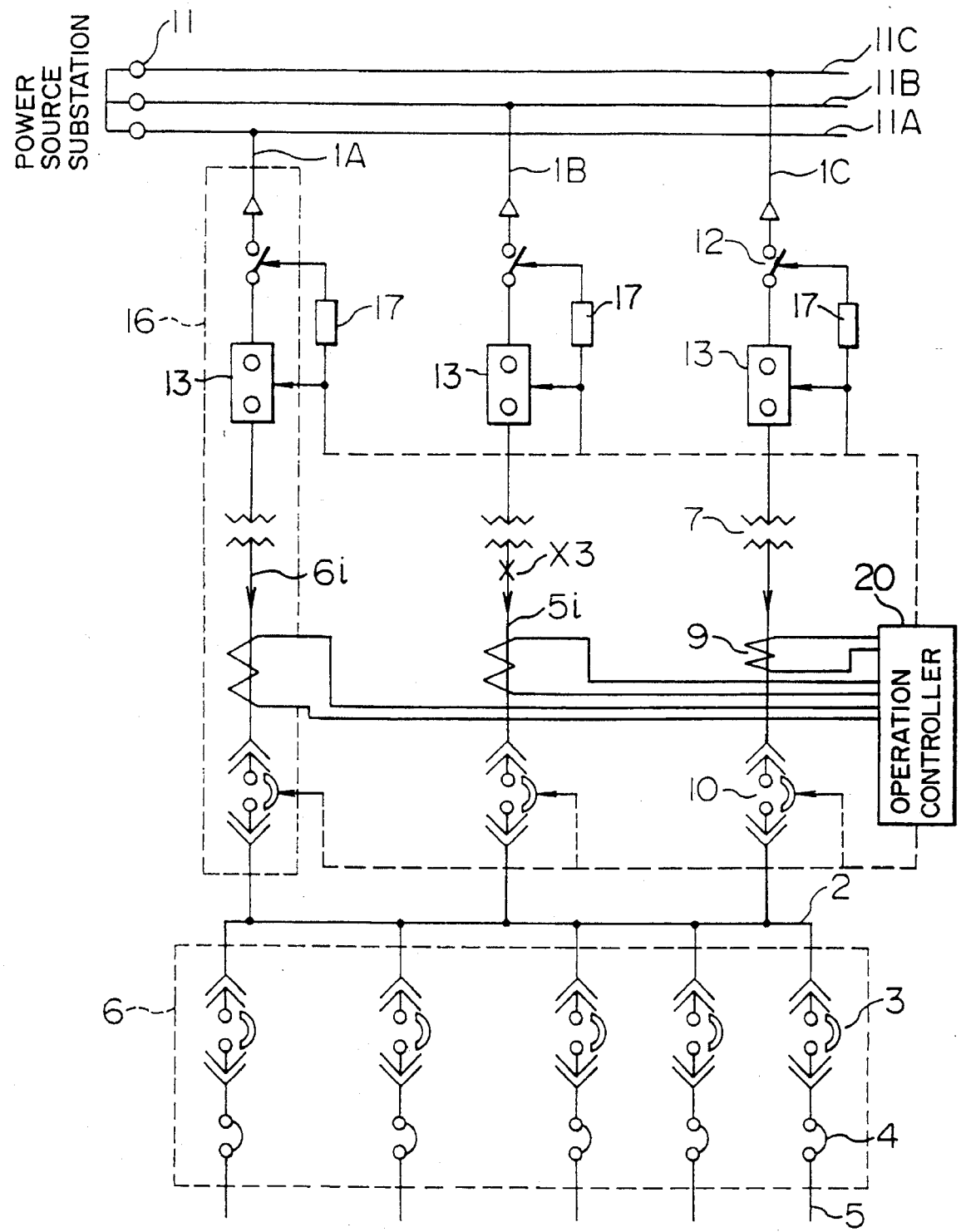
FIG. 2 is a skeleton connection diagram of a network power receiving system for high voltage according to another embodiment of the invention.

The first relay 14 is connected to the protector breaker 10 and vacuum breaker 13. The second relay 15 is connected to the protector breaker 10. The first relay may be energized by a setting value corresponding to, for example, about 50000 A. The second relay 15 may be energized by a setting value corresponding to, for example, about 20000 A. The first and second relays 14 and 15 are activated by counter-flow currents. In other words, the second relay 15 is activated by a smaller accident current than that for the first relay 14. The first relay 14 and the second relay 15 are also operated in a manner as shown in FIGS. 1–3 of U.S. Pat. No. 4,873,601 described above as prior art that each of the relays 14 and 15 determines the short-circuiting current $2i$ and the normal current $1i$ from a difference at normal and short-circuiting current states between a phase angle of a phase voltage from a measuring transformer (not shown) connected to the network lines 1A–1C between the protector breaker 10 and the network bus 2 on the network lines 1A–1C and a phase angle of a detection current from the current transformer 9.

A protector switch gear board (for example, a powerboard) 16 houses the electrical components, for example, the protector breaker 10, load switch 12, vacuum breaker 13 and so on connected in each of the network lines 1A, 1B and 1C between the load switch 12 and network bus 2. The load switch 12 may be replaced with the vacuum breaker 13 combined with a breaker. The protector switch gear board 16 is also provided for each of the network lines 1B and 1C but is omitted in the drawing. An operation controller 20 as shown in FIG. 2 may substitute for the relays 14 and 15.

Operation and effect of the network power receiving system according to the invention will now be described.

(1) In the event that an accident takes place at an accident point X1 on the secondary side of the network transformer 7 in the network line 1B, first and second accident currents $1i$ and $2i$ flow to the accident point X1. The first accident current $1i$ is a forward current which flows from the power source bus 11B to the network transformer 7. When neglecting other impedance than that of the network transformer 7, the current value of the first accident current $1i$ can be expressed by the following equation:

$$1i = \text{capacity (KVA) of network transformer } 7/\sqrt{3} \times$$
$$\text{primary voltage (KV) of network transformer } 7 \times$$
$$\% \text{ impedance value } (\%)$$
$$= 2000 \text{ (KVA)}/\sqrt{3} \times 22 \text{ (KV)} \times 7.5(\%)$$
$$= 699.83$$
$$\approx 700 \text{ (A)}$$

The second accident current $2i$ is a current which flows in opposition to the first accident current $1i$. The second accident current $2i$ is a resultant current from the network lines 1A and 1C which join in the network line 1B and therefore it is of a far larger current value than that of the first accident current $1i$. Given that the network lines 1A and 1C are under the same condition, the second accident current $2i$ is twice as large as the current in each of the networks 1A and 1C and can be expressed by the following equation:

$$2i = \text{(capacity (KVA) of network transformer 7 in}$$
$$1A \times 2)/(\sqrt{3} \times \text{secondary voltage (KV) of}$$
$$\text{network transformer } 7 \times \% \text{ impedance value } (\%))$$
$$= (20000 \text{ (KVA)} \times 2)/(\sqrt{3} \times 0.415 \text{ (KV)} \times 7.5(\%))$$
$$= 74199.8$$
$$\approx 74200 \text{ (A)}$$

When this counter flow of the second accident current $2i$ of 74199.8≈74200 (A) flows, the first relay 14 (corresponding to 50000 A) and the second relay 15 (corresponding to 20000 A) are energized and an output signal from the relay 14 is applied to the vacuum breaker 13 and protector breaker 10 with an output signal from the second relay 15 applied to the protector breaker 10, so that the vacuum breaker 13 and protector breaker 10 are opened to interrupt the first and second accident currents $1i$ and $2i$.

After interrupting the first accident current $1i$, the vacuum breaker 13 opens the load switch 12 to prevent the vacuum breaker 13 from being applied with circuit voltage during a long interval of time.

Accordingly, a line section between the network transformer 7 and the protector breaker 10 can be protected to extend the protective range as compared to the conventional protective range by which the line section between the fuse and the protector breaker can be protected.

In addition, since the vacuum breaker 13 can equivalently switch off the current on the second side of the network transformer 7 by switching off the current (700 A) on the primary side of network transformer 7 smaller than the secondary side current, a breaker of low interruption capacity which is compact and inexpensive can be used as the vacuum breaker 13, thus attaining scale reduction and cost reduction of the network power receiving equipment.

Similar effects can also be attained by applying the teachings of the invention to a circuit in which a vacuum breaker and a current transformer are respectively connected in the primary and secondary side circuits of a transformer, an accident current in the secondary side circuit is detected by the current transformer and a relay is energized by a detected current to open the vacuum breaker.

(2) On the other hand, in the event that an accident takes place at an accident point X2 on the primary side of the network transformer 7 in the network line 1B, third and fourth accident currents $3i$ and $4i$ flow to the accident point X2. The third accident current $3i$ activates the power source side breaker 11 and is consequently interrupted. The third accident current $3i$ is determined depending on the power source capacity of the power source substation and is a very large current.

The fourth accident current $4i$ is a current in opposition to the third accident current $3i$ and is different from the third accident current $3i$ in that it is a resultant current of currents from other network lines than the accident network line 1B, that is, the network lines 1A and 1C, and joining in the network line 1B. The fourth accident current counter flows to the accident point X2 through the network transformer 7 connected in the network line 1B. Through calculation, this fourth accident current $4i$ can be expressed by the following equation:

$$4i = \text{(capacity (KVA) of network transformer 7 in}$$
$$1B \times 2)/[\sqrt{3} \times \text{secondary voltage (KV) of}$$
$$\text{network transformer } 7 \times \{(1 + 1/2) \times$$
$$\% \text{ impedance value } (\%)\}]$$
$$= 20000 \text{ (KVA)}/(\sqrt{3} \times 0.415 \text{ (KV)} \times (1 + 1/2) \times 7.5(\%))$$
$$= 24733$$
$$= 24700 \text{ (A)}$$

where in the coefficient (1+½) of the % impedance value (%), 1 is an impedance value of the network line 1B and ½ is an impedance value of the respective network lines 1A and 1C, from which currents flow and joint in the network line 1B.

When the fourth accident current $4i$ of 24700 (A) counter flows to the accident point X2, the first relay 14 (corresponding to 50000 A) is not energized but the second relay 15 (corresponding to 20000 A) is energized, so that the protector breaker 10 is opened to interrupt the fourth accident current $4i$ of 24700 (A). The third accident current $3i$ flows to the load switch 12 and vacuum breaker 13 before the power source side breaker 11 is activated. Since the first relay 14 is not energized, the vacuum breaker 13 does not interrupt the primary current of the network transformer. Accordingly, the vacuum breaker 13 used can be of low interruption capacity and low voltage and can be compact and inexpensive.

(3) The operation controller 20 shown in FIG. 2 can substitute for the first and second relays 14 and 15 to reduce the scale of the network power receiving system.

In the event an accident current $5i$ having an opposite direction to a normal current $6i$ flows in an initial accident point X3 produced owing to, for example, a layer short in the secondary coil of the network transformer 7 connected to the network line 1B, the accident current produced in the secondary coil is larger than an accident current produced in the primary coil. Accordingly, the operation controller 20 actuates to open the protector breaker 10 and the vacuum breaker 13.

Inversely, when the layer short is produced in the primary coil of the network transformer 7, the primary side accident current is smaller than the secondary side accident current. Then, the operation controller 20 actuates to open the protector breaker 10 only. In short, the operation controller 20 is provided with a function similar to that of the relays 14 and 15 as shown in FIG. 1.

(4) A delay device 17 is additionally provided between the vacuum breaker 13 and load switch 12 in order that the load switch 12 can be opened by means of the delay device 17 after the vacuum breaker 13 is opened. Thus, the accident current on the secondary side of the network transformer 7 is detected by the current transformer 9 associated therewith and then interrupted by the vacuum breaker 13. Accordingly, the vacuum breaker 13 operatively interrupts only the accident current on the primary side, and a small current to the vacuum breaker 13 and voltage of the network line are switched off by the load switch 12, thereby ensuring that a vacuum contactor for simply switching off the small current can be used as the vacuum breaker 13 and in addition the scale reduction and cost reduction of the network power receiving equipment can be attained.

In an alternative, a breaker is provided on the primary side of a network transformer and a current transformer is provided on the secondary side so that after detection of an accident current by the current transformer, the breaker may be opened.

As described above, according to the invention, an accident current on the secondary side of the transformer is detected by the current detector and the breaker on the primary side of the transformer is opened by a detection signal. As a result, the breaker is required to interrupt only the primary side current smaller than the secondary side current and therefore this breaker can be of low interruption capacity to reduce the scale of the power receiving equipment and to expand the protective range such that it covers a line section between the transformer and the breaker.

We claim:

1. A power receiving system comprising:
   a plurality of network lines for delivering power and a network bus for receiving said power, with each network line having associated therewith:
   a network transformer connected between said network line and said network bus;
   a protector breaker and a current detector both of which are connected to a secondary side of said network transformer;
   a breaker provided on a primary side of said network transformer and having a breaker interruption capacity which is smaller than that of said protector breaker; and
   relay means responsive to a detection current which is detected by said current detector, for opening said breaker and said protector breaker when said current detector detects a first type of accident current flowing in a direction opposite to that of a normal current flow and indicating an accident point on the secondary side of said network transformer, and for opening only said protector breaker when said current detector detects a second type of accident current flowing in a direction opposite to that of said normal current flow and indicating an accident point on a primary side of said network transformer.

2. A power receiving system according to claim 1 wherein said relay means includes an operation controller.

3. A power receiving system according to claim 1 wherein said breaker includes at least one of a vacuum breaker and a vacuum contactor.

4. A power receiving system comprising:
   a plurality of network lines for delivering power and a network bus for receiving said power, with each network line having associated therewith:
   a network transformer connected between a load side of said network line and said network bus;
   a load switch connected to a primary side of said network transformer;
   a protector breaker and a current detector both of which are connected to a secondary side of said network transformer;
   a breaker provided on a primary side of said network transformer and having a breaker interruption capacity which is smaller than that of said protector breaker; and
   an operation controller responsive to detection of a current for opening said breaker and said protector breaker when there is detected a first type of current flowing in a direction opposite to a direction of a normal current flow and indicating an accident point on the secondary side of said network transformer, and for opening only said protector breaker when there is detected a second type of current flowing in a direction opposite to a direction of said normal current flow and indicating an accident point on the primary side of said network transformer.

5. A power receiving system according to claim 4 wherein said load switch includes a breaker.

6. A power receiving system comprising:
   a plurality of network lines for delivering power and a network bus for receiving said power, with each network line having associated therewith:
   a network transformer connected between a load side of said network line and said network bus;
   a protector breaker and a current detector both of which are connected to a secondary side of said network transformer;
   a breaker provided on a primary side of said network transformer, and having a breaker interruption capacity which is smaller than that of said protector breaker;
   relay means responsive to a detection signal which is detected by said current detector, for opening said breaker and said protector breaker when said current detector detects a first type of accident current flowing in an opposite direction than a normal current flow on the secondary side of said network transformer and indicating an accident point on a secondary side of said network transformer, and for opening only said protector breaker when said current detector detects a second type of accident current flowing in an opposite direction than said normal current flow and indicating an accident point on a primary side of said network transformer;

a load switch connected to the breaker side of the network lines; and a delay device connected to said load switch and said breaker to open said load switch after lapse of a predetermined time from when said breaker is opened.

7. A power receiving system according to claim 6 wherein said relay means include an operation controller.

* * * * *